US009854102B2

(12) United States Patent
Ma et al.

(10) Patent No.: US 9,854,102 B2
(45) Date of Patent: Dec. 26, 2017

(54) SYSTEMS AND METHODS OF PROVIDING COMMUNICATIONS SERVICES

(71) Applicant: VONAGE AMERICA INC., Holmdel, NJ (US)

(72) Inventors: Ka-Yui Kevin Ma, North Brunswick, NJ (US); John Erickson, Seattle, WA (US); Eugene Peter Cannon, Red Bank, NJ (US)

(73) Assignee: VONAGE AMERICA INC., Holmdel, NJ (US)

( * ) Notice: Subject to any disclaimer, the term of this patent is extended or adjusted under 35 U.S.C. 154(b) by 0 days.

(21) Appl. No.: 14/447,125

(22) Filed: Jul. 30, 2014

(65) Prior Publication Data

US 2014/0341364 A1 Nov. 20, 2014

Related U.S. Application Data

(63) Continuation of application No. 13/730,348, filed on Dec. 28, 2012, which is a continuation-in-part of
(Continued)

(51) Int. Cl.
*H04M 15/06* (2006.01)
*H04M 7/00* (2006.01)
(Continued)

(52) U.S. Cl.
CPC .......... *H04M 7/0057* (2013.01); *H04L 12/16* (2013.01); *H04L 29/06* (2013.01); *H04L 47/80* (2013.01);
(Continued)

(58) Field of Classification Search
CPC ....... H04W 76/02; H04W 4/02; H04W 64/00; H04W 4/00; H04W 4/003; H04W 60/00;
(Continued)

(56) References Cited

U.S. PATENT DOCUMENTS 6,141,341 A 10/2000 Jones et al.
6,539,077 B1 3/2003 Ranalli et al.
(Continued)

FOREIGN PATENT DOCUMENTS

DE 103 41 737 A1 4/2005
EP 2 190 174 A1 5/2010
(Continued)

OTHER PUBLICATIONS

International Search Report issued in PCT/US2012/048591 on Dec. 21, 2012.
(Continued)

*Primary Examiner* — Melanie Jagannathan
*Assistant Examiner* — Najeebuddin Ansari
(74) *Attorney, Agent, or Firm* — Nixon & Vanderhye P.C.; Joseph Pagnotta

(57) ABSTRACT

An IP telephony system allows a user to register a telephony device that receives its native telephony service from a different telephony service provider as an extension telephone. The user can then place calls through the IP telephony system using the extension telephone. Such calls may or may not be established using the extension telephone's native telephony service provider.

17 Claims, 11 Drawing Sheets

Related U.S. Application Data application No. 13/244,872, filed on Sep. 26, 2011, and a continuation-in-part of application No. 13/244,827, filed on Sep. 26, 2011, now Pat. No. 8,265,083.

(60) Provisional application No. 61/512,265, filed on Jul. 27, 2011, provisional application No. 61/529,742, filed on Aug. 31, 2011.

(51) Int. Cl.
    *H04L 29/06*     (2006.01)
    *H04L 12/16*     (2006.01)
    *H04L 12/927*    (2013.01)
    *H04M 3/42*     (2006.01)

(52) U.S. Cl.
    CPC .......... *H04L 63/08* (2013.01); *H04L 65/1053* (2013.01); *H04L 65/1059* (2013.01); *H04L 65/1069* (2013.01); *H04L 65/1096* (2013.01); *H04M 3/42042* (2013.01)

(58) Field of Classification Search
    CPC ....... H04W 88/04; H04W 8/26; H04W 92/02; H04W 40/20; H04W 4/24; H04W 8/18; H04L 65/1069; H04L 67/18; H04L 29/12018
    USPC ................................................. 370/352–356
See application file for complete search history.

(56) References Cited

U.S. PATENT DOCUMENTS

| | | |
|---|---|---|
| 7,106,848 B1 | 9/2006 | Barlow et al. |
| 7,280,535 B1 | 10/2007 | Bergman et al. |
| 7,305,079 B1 | 12/2007 | Forte |
| 7,613,170 B1 | 11/2009 | Grabelsky et al. |
| 7,751,347 B2 | 7/2010 | Giroti |
| 7,907,550 B1 | 3/2011 | Chu et al. |
| 7,990,912 B2 | 8/2011 | Nix et al. |
| 8,265,083 B1 | 9/2012 | Cannon |
| 2003/0147518 A1 | 8/2003 | Albal |
| 2004/0028208 A1 | 2/2004 | Carnazza et al. |
| 2004/0266415 A1 | 12/2004 | Belkin |
| 2005/0058269 A1 | 3/2005 | Watts et al. |
| 2005/0152338 A1 | 7/2005 | Chen |
| 2005/0163301 A1 | 7/2005 | Didcock |
| 2005/0180555 A1 | 8/2005 | Sarp et al. |
| 2005/0239496 A1 | 10/2005 | Sylvain |
| 2006/0013374 A1 | 1/2006 | Fleischer |
| 2006/0072726 A1 | 4/2006 | Klein et al. |
| 2006/0093118 A1 | 5/2006 | Agrawal et al. |
| 2006/0135138 A1 | 6/2006 | Lazaridis |
| 2006/0154675 A1 | 7/2006 | Chapman |
| 2006/0189337 A1 | 8/2006 | Farrill |
| 2007/0019545 A1 | 1/2007 | Alt et al. |
| 2007/0037550 A1 | 2/2007 | Rassam |
| 2007/0047516 A1 | 3/2007 | Kottilingal |
| 2007/0047523 A1 | 3/2007 | Jiang |
| 2007/0049245 A1 | 3/2007 | Lipman |
| 2007/0058569 A1 | 3/2007 | McMenamin |
| 2007/0060137 A1 | 3/2007 | Yeatts et al. |
| 2007/0093248 A1 | 4/2007 | Gelderblom |
| 2007/0115928 A1 | 5/2007 | Benco |
| 2007/0127680 A1 | 6/2007 | Forte |
| 2007/0153991 A1* | 7/2007 | Daigle ................. 379/88.21 |
| 2007/0201453 A1* | 8/2007 | Desa et al. ............. 370/356 |
| 2007/0249323 A1 | 10/2007 | Lee |
| 2008/0056235 A1 | 3/2008 | Albina et al. |
| 2008/0107252 A1 | 5/2008 | Forte |
| 2008/0137642 A1 | 6/2008 | Teodosiu et al. |
| 2008/0175225 A1 | 7/2008 | Chu |
| 2008/0205414 A1 | 8/2008 | Katz et al. |
| 2008/0244148 A1 | 10/2008 | Nix |
| 2009/0124263 A1 | 5/2009 | Wirtl |
| 2009/0210536 A1 | 8/2009 | Allen |
| 2009/0245179 A1 | 10/2009 | Liu et al. |
| 2009/0274284 A1* | 11/2009 | Arsenault et al. ......... 379/142.1 |
| 2009/0279534 A1* | 11/2009 | Reiher ..................... 370/352 |
| 2009/0310598 A1 | 12/2009 | Winbladh et al. |
| 2010/0080202 A1 | 4/2010 | Hanson |
| 2010/0091761 A1 | 4/2010 | Arnaud |
| 2010/0095358 A1 | 4/2010 | Kruk |
| 2010/0150336 A1 | 6/2010 | Chen |
| 2010/0150337 A1 | 6/2010 | Chen |
| 2010/0197288 A1 | 8/2010 | Camilleri |
| 2010/0226362 A1* | 9/2010 | Kim et al. ..................... 370/352 |
| 2010/0322396 A1 | 12/2010 | Southerland |
| 2011/0044322 A1 | 2/2011 | Deng et al. |
| 2011/0096771 A1* | 4/2011 | Saru ................. H04L 65/1069 370/352 |
| 2011/0111770 A1 | 5/2011 | Kocharlakota |
| 2011/0212705 A1* | 9/2011 | Sprigg et al. ................. 455/410 |
| 2011/0286443 A1 | 11/2011 | Wu et al. |
| 2012/0164988 A1 | 6/2012 | Jordan |
| 2012/0177029 A1 | 7/2012 | Hillier |
| 2012/0202474 A1 | 8/2012 | Gisby |
| 2012/0219128 A1* | 8/2012 | Farah et al. ............... 379/88.19 |
| 2012/0329489 A1 | 12/2012 | McGary |
| 2013/0034220 A1 | 2/2013 | Ozeri |
| 2013/0070755 A1 | 3/2013 | Trabelsi |
| 2013/0217362 A1 | 8/2013 | Young |

FOREIGN PATENT DOCUMENTS

| | | |
|---|---|---|
| EP | 2 211 531 A1 | 7/2010 |
| EP | 1675422 | 11/2010 |
| WO | WO 2001/049060 | 7/2001 |
| WO | 03/005741 | 1/2003 |
| WO | 2004/057886 | 7/2004 |
| WO | WO 2005/122541 | 12/2005 |
| WO | WO 2007/036248 | 4/2007 |
| WO | 2008/056253 | 5/2008 |
| WO | WO 2008/097254 | 8/2008 |
| WO | 2009/001329 | 12/2008 |
| WO | WO 2009/031974 | 3/2009 |

OTHER PUBLICATIONS

Written Opinion issued in PCT/US2012/048591 on Dec. 21, 2012.
Office Action issued in Israel Patent Appl 224702 on Aug. 18, 2013 with English Language Translation.
Office Action issued in Mexican Patent Appl MX/a/2013/002183 on Apr. 23, 2013 with English Language Translation.
Office Action issued in Philippines Patent Appl 1-2013-500278 on Aug. 19, 2013.
Notice of Allowance issued in Korean Patent Appl 2013-7010138 on Sep. 17, 2013 with English Language Translation.
Search Report issued in EP Patent Application No. 12817284.8 on Dec. 12, 2013.
Examination Report issued in EP Patent Application No. 12817284.8 on Jan. 6, 2014.
Office Action issued in Israel Patent Application No. 224702 on Jan. 1, 2014.
Notice of Allowance issued in Mexican Patent Application No. MX/a/2013/002183 on Nov. 11, 2013 with English Language Translation.
Office Action issued in Mexican Patent Application No. MX/a/2013/011953 on May 26, 2014 with English Language Translation.
Apr. 2, 2014 Notice of Allowance issued in Canadian Application No. 2808463.
Apr. 10, 2015 Office Action issued in U.S. Appl. No. 14/447,342.
Apr. 13, 2012 Office Action issued in U.S. Appl. No. 13/244,872.
Apr. 14, 2015 International Preliminary Report on Patentability issued in PCT/US2013/063822.
Apr. 23, 2015 Office Action Notice of Allowance issued in Canadian Application No. 2808463.
Apr. 25, 2013 Office Action issued in U.S. Appl. No. 13/730,287.
Apr. 25, 2013 Office Action issued in U.S. Appl. No. 13/730,348.
Apr. 26, 2013 Office Action issued in U.S. Appl. No. 13/730,325.

(56) References Cited

OTHER PUBLICATIONS

Aug. 7, 2015 Office Action issued in Mexican Application No. MX/a/2013/011953.
Aug. 16, 2012 Advisory Action issued in U.S. Appl. No. 13/244,872.
Dec. 3, 2014 Notice of Allowance issued in Israeli Application No. 224702.
Dec. 13, 2011 Office Action issued in U.S. Appl. No. 13/244,872.
Dec. 29, 2011 Office Action issued in U.S. Appl. No. 13/244,827.
Feb. 5, 2014 International Search Report issued in PCT/US2013/063822.
Feb. 5, 2014 Written Opinion issued in PCT/US2013/063822.
Feb. 15, 2017 Notice of Allowance issued in U.S. Appl. No. 13/730,325.
Feb. 16, 2016 Notice of Allowance issued in Mexican Application No. MX/a/2013/011953.
"How to Set a Google Voice Number As Your Caller ID on Skype," May 18, 2010, XP002701052, Retrieved from the Internet: http://web.archive.org/web/20100518054534/http://www.wikihow.com/Set-a-Google-Voice-Number-As-Your-Caller-ID-on-Skype [retrieved on Jul. 9, 2013].
Jan. 3, 2014 Office Action issued in U.S. Appl. No. 13/730,287.
Jan. 6, 2014 Office Action issued in U.S. Appl. No. 13/730,325.
Jan. 16, 2014 Office Action issued in U.S. Appl. No. 13/648,147.
Jan. 19, 2015 Office Action issued in Mexican Application No. MX/a/2013/011953.
Jan. 28, 2014 International Preliminary Report on Patentability issued in PCT/US2012/048591.
Jul. 14, 2016 Office Action issued in U.S. Appl. No. 14/447,432.
Jul. 16, 2012 Notice of Allowance issued in U.S. Appl. No. 13/244,827.
Jun. 6, 2014 International Search Report issued in PCT/US2013/078242.
Jun. 6, 2014 Written Opinion issued in PCT/US2013/078242.
Jun. 17, 2016 Office Action issued in U.S. Appl. No. 14/447,342.
Jun. 30, 2015 International Preliminary Report on Patentability issued in PCT/US2013/078242.
Mar. 8, 2017 Notice of Allowance issued in U.S. Appl. No. 13/730,348.
Mar. 9, 2017 Office Action issued in U.S. Appl. No. 14/447,342.
Mar. 22, 2017 Office Action issued in U.S. Appl. No. 14/447,432.
May 18, 2015 Office Action issued in U.S. Appl. No. 13/244,872.
Nov. 19, 2014 Office Action issued in U.S. Appl. No. 14/447,342.
Oct. 7, 2013 Office Action issued in U.S. Appl. No. 13/730,348.
Oct. 9, 2014 Office Action issued in U.S. Appl. No. 13/648,129.
Oct. 13, 2014 Office Action issued in European Application No. 12817284.8.
Sep. 12, 2014 Office Action issued in U.S. Appl. No. 13/244,872.
Sep. 23, 2014 Office Action issued in U.S. Appl. No. 13/648,147.
Aug. 19, 2016 Extended European Search Report issued in European Application No. 15202449.3.
Dec. 1, 2016 Office Action issued in Israeli Application No. 237426.
Dec. 28, 2016 Office Action issued in Canadian Application No. 2904902.
Jul. 23, 2015 Office Action issued in Israeli Application No. 237426.
Sep. 22, 2017 Office Action issued in U.S. Appl. No. 13/730,348.
Sep. 25, 2017 Office Action issued in U.S. Appl. No. 13/730,325.

* cited by examiner

SYSTEMS AND METHODS OF PROVIDING COMMUNICATIONS SERVICES

This application is a continuation of U.S. application Ser. No. 13/730,348, filed Dec. 28, 2012, which is itself a continuation-in-part of application Ser. No. 13/244,872, filed Sep. 26, 2011, and a continuation-in-part of application Ser. No. 13/244,827, filed Sep. 26, 2011, now U.S. Pat. No. 8,265,083, both of which claim priority to the filing dates of Provisional Application No. 61/512,265, filed Jul. 27, 2011, and Provisional Application No. 61/529,742, filed Aug. 31, 2011. The contents of all of those applications are incorporated herein by reference.

BACKGROUND OF THE INVENTION

The invention is related to Internet protocol (IP) telephony systems that allow users to place and receive telephone calls, and to send and receive text and video messages via data packets that are communicated over a data network.

Presently, there are many IP telephony systems that provide telephony services to their users. Typically, a user will register with an IP telephony system to obtain telephony services at their residence or business. As part of the registration process, one or more of the user's telephony devices in their home or business are registered with the IP telephony system.

When the user wishes to place a call or send a text or video message, the user's telephony device contacts a server or a gateway maintained by the IP telephony system over a public and/or private data network. The server or gateway then acts to provide the user with the requested communications services.

IP telephony systems can provide the same types of communications services as traditional telephony service providers that operate through a publically switched telephone network (PSTN), but at significantly lower costs. For this reason, many people have switched their residential and business telephony service provider from a traditional PSTN-based telephony services provider to an IP telephony service provider.

Many users also have a separate mobile or cellular telephone in addition to their residential and business telephones. Although it would be desirable to utilize an IP telephony service provider to obtain certain types of communications services on mobile telephones, doing so is often inconvenient.

Generally, the only way to place international long distance telephone calls through an IP telephony service provider using a mobile telephone is to pre-pay for an IP telephony service that is separate and distinct from the carrier that provides the regular native telephony service to the user's mobile telephone. Once the user has prepaid for a certain amount of minutes, in order to place a telephone call using the IP telephony service, the user must engage in a cumbersome dialing procedure. In order to use the IP telephony service, the user may need to remember a username or account number, as well as a PIN or password.

Thus, although it is possible to obtain lower cost IP telephony services on a mobile telephone, it is not convenient or quick to place calls through the service. Further, the user must engage in a separate financial transaction to obtain minutes of call time on the IP telephony service. Also, if the user has an account with an IP telephony service that is left with only a few minutes of talk time, the user may choose to not use the remaining minutes, meaning some of the money spent to acquire minutes of talk time on the IP telephony system will be lost.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

The technology is related to telephony systems generally. The technology encompasses systems and methods of providing communications services to a user's telephony device that is native to a first telephony system through a second telephony system. Preferably, the second telephony system is an IP based telephony system and is distinct from the first telephony system.

In the following description, the terms VOIP, VOIP (Voice over IP) system, VOIP telephony system, IP system and IP telephony system are all intended to refer to a system that connects callers and that delivers data, text and video communications using Internet protocol data communications.

Figure 1:
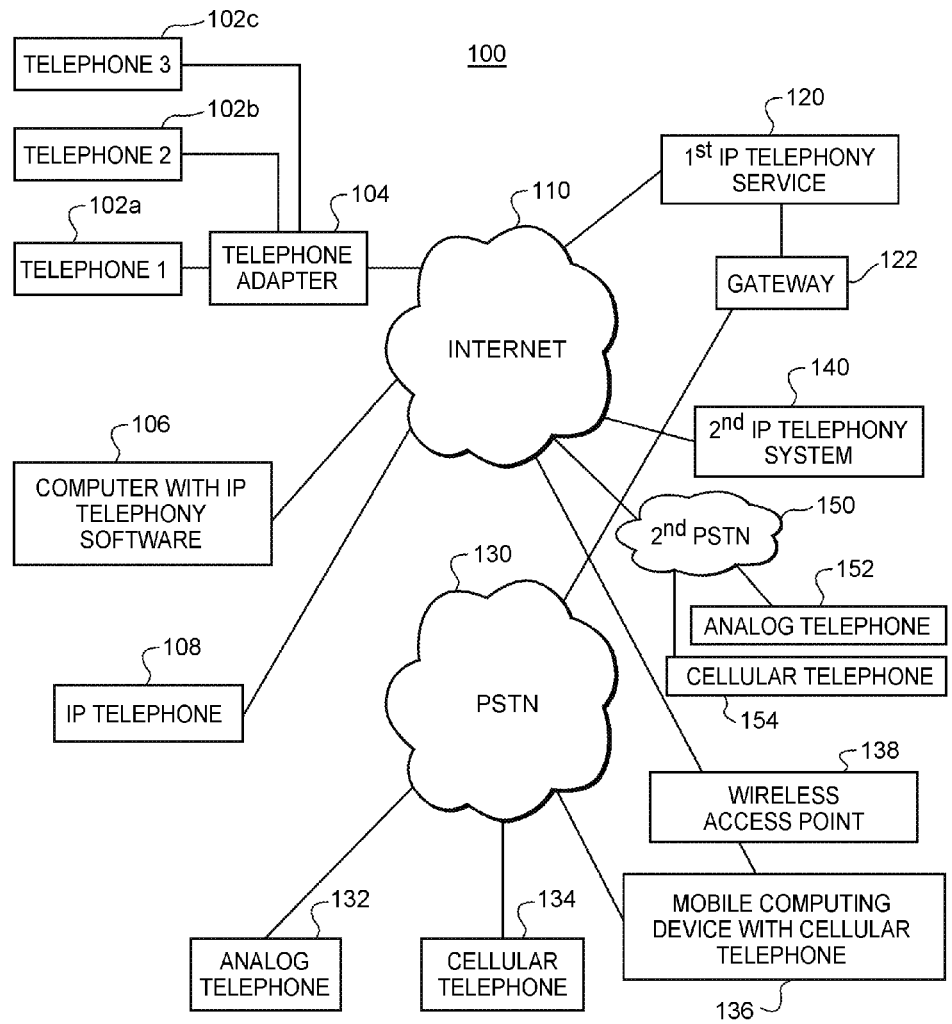
FIG. 1 is a diagram of a communications environment including various elements which are associated with an Internet protocol (IP) telephony system operating in accordance with the invention.

As illustrated in FIG. 1, a communications environment 100 is provided to facilitate IP enhanced communications. An IP telephony system 120 enables connection of telephone calls between its own customers and other parties via data communications that pass over a data network. The data network is commonly the Internet 110, although the IP telephony system may also make use of private data networks. The IP telephony system 120 is connected to the Internet 110. In addition, the IP telephony system 120 is connected to a first publicly switched telephone network (PSTN) 130 via a gateway 122. The first PSTN 130 may also be directly coupled to the Internet 110 through one of its own internal gateways. Thus, communications may pass back and forth between the first IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a cellular telephone system to access the Internet 110.

Alternatively, a customer could utilize a normal analog telephone 102a which is connected to the Internet 110 via a telephone adapter 104. The telephone adapter 104 converts analog signals from the telephone 102a into data signals that pass over the Internet 110, and vice versa. Also, as illustrated in FIG. 1, multiple analog telephone devices 102a, 102b and 102c could all be coupled to the same telephone adaptor 104. Analog telephone devices include but are not limited to standard telephones and document imaging devices such as facsimile machines. A configuration using a telephone adapter 104 is common where all of the analog telephone devices 102a, 102b and 102c are located in a residence or business, and all of the telephone devices are connected to the same telephone adapter. With this type of a configuration, all of the analog telephone devices 102a, 102b, 102c share the same telephone number assigned to the telephone adaptor 104. Other configurations are also possible where multiple communication lines (e.g., a second telephone number) are provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected to one or more analog telephones 102.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In addition, mobile computing devices which include cellular telephone capabilities could also be used to place telephone calls to customers of the IP telephony system. A mobile computing device 136, as illustrated in FIG. 1, might connect to the PSTN 130 using its cellular telephone capabilities. However, such devices might also have the ability to connect wirelessly via some other means. For example, a mobile computing device 136 might communicate with a wireless access point 138 which connects the mobile computing device 136 directly to a data network, such as the Internet 110. In this instance, communications between the mobile computing device 136 and other parties could be entirely carried by data communications which pass from the mobile computing device 136 directly to a data network 110. Of course, alternate embodiments could utilize any other form of wireless communications path to enable communications.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

FIG. 1 also illustrates that a second IP telephony system 140 may interact with the first IP telephony system 120 via the Internet 110. For example, customers of the second IP telephony system 140 may place calls to customers of the first IP telephony system 120. In that instance, assets of the second IP telephony system 140 interact with assets of the first IP telephony system 120 to setup and carry the telephone call. The same basic thing could happen if customers of the first IP telephony system 120 place calls to customers of the second IP telephony system 140.

FIG. 1 also illustrates a second PSTN 150 that is coupled to an analog telephone 152 and a cellular telephone 154. The second PSTN 150 may also be directly coupled to the Internet 110 through one of its own internal gateways. Thus, communications may pass back and forth between the first IP telephony system 120 and the second PSTN 150 through the Internet 110 via a gateway maintained within the second PSTN 150. Calls from customers of the first IP telephony system 120 may be routed to the analog telephone 152 or the cellular telephone 154 through the second PSTN 154.

For purposes of the following description, we will assume that the first PSTN 130 is located in a first country, and that the second PSTN 140 is located in a second country. Likewise, the analog telephone 132 and cellular telephone 134 coupled to the first PSTN 130 are located in the first country, whereas the analog telephone 152 and cellular telephone 154 coupled to the second PSTN 150 are located in the second country.

Figure 2:
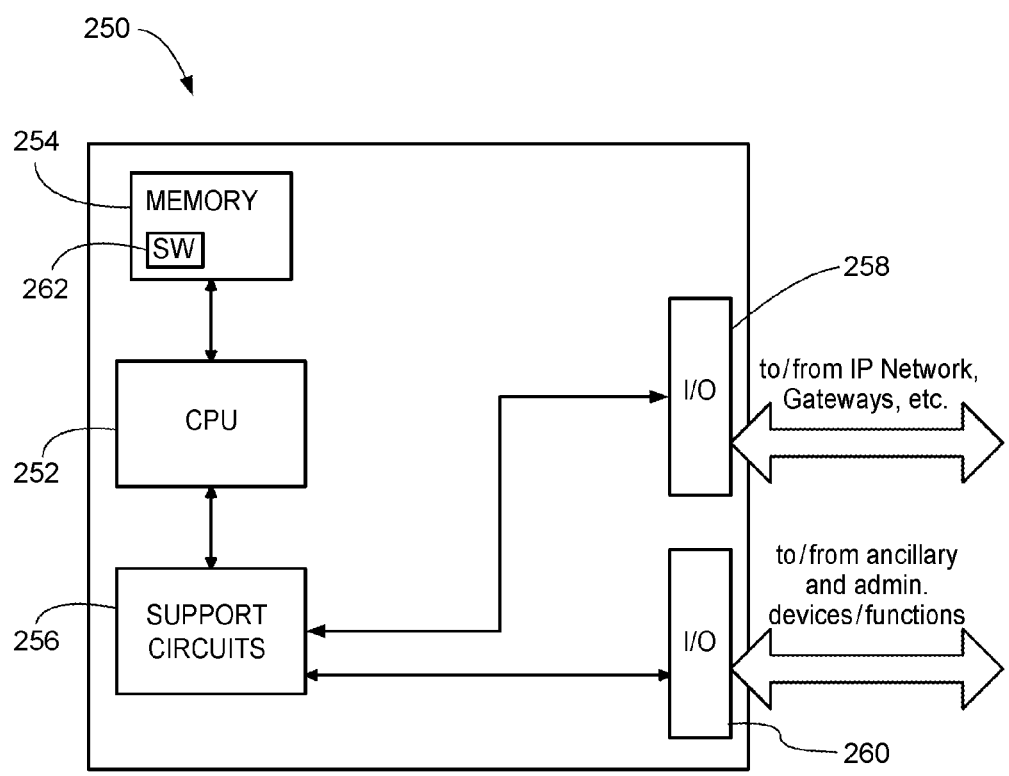
FIG. 2 is a diagram of various elements of a processor that forms part of a IP telephony system.

FIG. 2 illustrates elements of a computer processor 250 that can be used as part of the IP telephony system 120 to accomplish various functions. The IP telephony system 120 could include multiple processors 250 located at various locations in the system, along with their operating components and programming, each carrying out a specific or dedicated portion of the functions performed by the IP telephony system 120.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment, to service provider equipment, to an IP network or gateways, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

In the following description, references will be made to an "IP telephony device." This term is used to refer to any type of device which is capable of interacting with an IP telephony system to complete a telephone call. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software client that enables the device to act as an IP telephone. Thus, a single device might be capable of operating as both a cellular telephone and an IP telephone.

Moreover, certain devices that are not traditionally used as telephony devices may act as telephony devices once they are configured with appropriate client software. Thus, some devices that would not normally be considered telephony devices may become telephony devices or IP telephony devices once they are running appropriate software.

The following description will also refer to telephony communications and telephony activity. These terms are intended to encompass all types of analog and video telephone calls, regardless of whether all or a portion of the calls are carried in an analog or digital format. These terms are also intended to encompass data communications that are conveyed through a PSTN or VOIP telephony system, such as facsimile transmissions, text messages, SMS messages, MMS messages, video messages, and all other types of data communications sent by or received by a user. In other words, these terms are intended to encompass any communications whatsoever, in any format, which traverse all or a portion of a communications network or telephony network.

Figure 3:
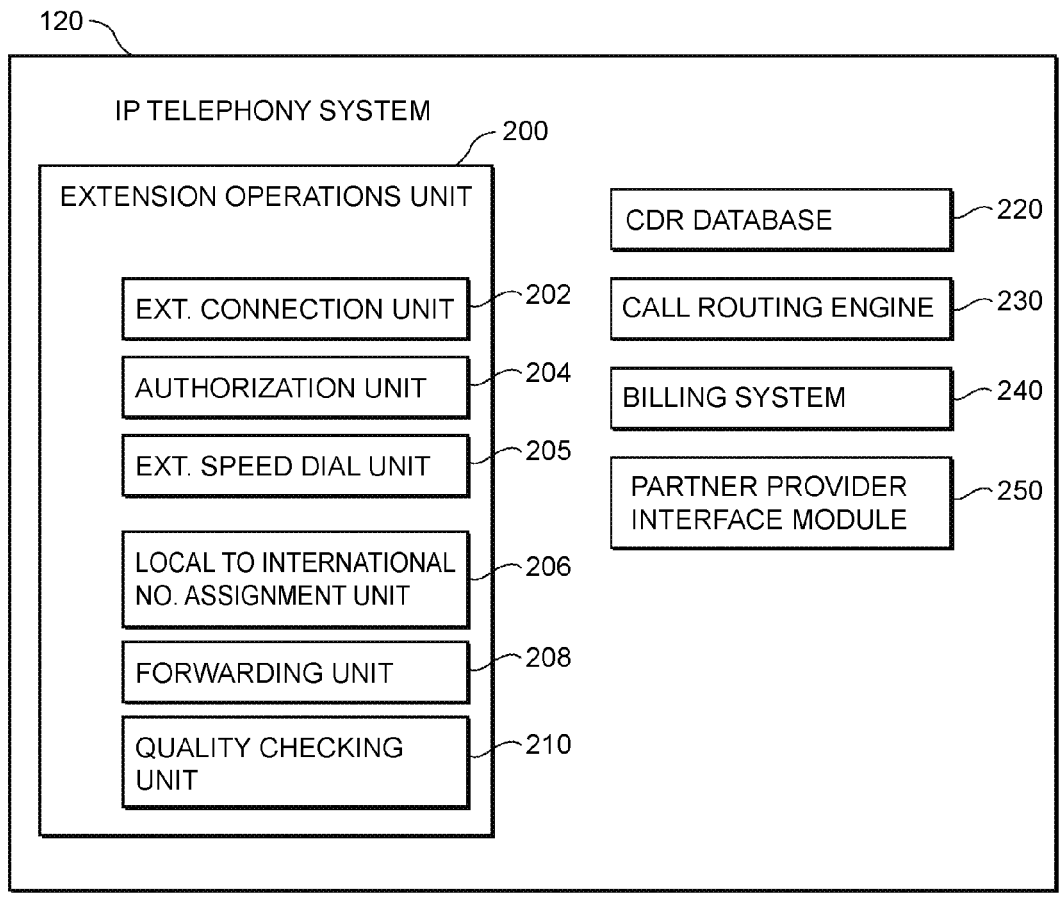
FIG. 3 is block diagram illustrating selected elements of an IP telephony system that is capable of providing telephony services to a telephony device that is native to another telephony system.

FIG. 3 illustrates elements of an IP telephony system 120. The IP telephony system 120 includes a call routing engine 230. The call routing engine 230 provides instructions to servers of the telephony system 120 to help the servers establish communications channels between a calling party and a called party. The call routing engine 230 also helps servers to deliver text messages, SMS messages, MMS messages and other forms of communications.

The IP telephony system 120 further includes a billing system 240. The billing system 240 uses information drawn from a call detail record (CDR) database 220, and possibly other sources, to determine how much to bill the users of the IP telephony system 120.

The IP telephony system 120 also includes a partner provider interface module 250. This module communicates various items of information with partner providers who help to complete telephone calls for the IP telephony system 120 in various locations throughout the world. The same partner providers may deliver incoming calls directed to users of the IP telephony system 120. In some instances, the partner providers may feed information about calls to the IP telephony system 120 via the partner provider interface module 250. This information could be used by the IP telephony system 120 to create CDRs for user calls.

The IP telephony system 120 provides communications services to its registered users through telephony devices that the users have registered with the IP telephony system. For example, and with reference to FIG. 1, assume that a first user who has established an account with the IP telephony system 120 has registered the telephone adaptor 104 with the IP telephony system 120. The IP telephony system 120 will have assigned a first telephone number to the first user's account, and calls to that telephone number will be routed to the telephone adaptor 104.

Likewise, assume that a second user who has an account with the IP telephony system 120 has registered the IP telephone 108 with the IP telephony system 120. The IP telephony system 120 will have assigned a second telephone number to the second user's account, and calls to that number will be routed to the IP telephone 108.

In the following description, and the appended claims, the IP telephony system 120 may be referred to as a telephony system that provides "landline type" telephony services. This description is intended to distinguish the IP telephony system from a traditional cellular telephone services provider. However, this does not mean that the IP telephony system is incapable of providing telephony services to a mobile or cellular telephone. In fact, quite the opposite is true, as will be explained below.

Next, assume that the first user also possesses the cellular telephone 134. The cellular telephone 134 is registered with a separate, first cellular telephony services provider. Also, assume that the second user possesses the mobile computing device with a cellular telephone 136. The mobile computing device with a cellular telephone 136 is registered with a separate, second cellular telephony services provider.

An IP telephony system 120 as illustrated in FIG. 3 is capable of providing communications services to a user through both the IP telephony device(s) that the user has registered with the IP telephony system 120, and through a telephony device that is registered with and obtains its native telephony service from a separate telephony services provider. Thus, for example, the first user could obtain telephony services from the IP telephony system 120 using the first user's cellular telephone 134 that is registered with a first cellular telephony services provider. Likewise, the second user could obtain telephony services from the IP telephony system 120 using the mobile computing device 136 that is registered with a second cellular telephony services provider. Further, the IP telephony system 120 will bill the first and second users for telephone calls made using the cellular telephone 134 and mobile computing device 136 as part of their regular monthly bills from the IP telephony system 120.

The IP telephony system 120 allows a user to register additional telephony devices that can act as "extensions" of the user's main IP telephony device(s). Thus, the first user can register his cellular telephone 134 as an extension telephony device. While incoming telephone calls directed to the first user's assigned telephone number will continue to be routed to the telephone adaptor 104, the first user can place outgoing telephone calls through the IP telephony system 120 using his cellular telephone 134, even though the first user's cellular telephone 134 is provided with its native telephony service by a separate cellular telephony services provider. This allows the first user to take advantage of the relatively low rates for long distance and international calls that are offered by the IP telephony system 120. Those rates will typically be significantly lower than the rates the first user would be charged by the cellular telephony services provider. In addition, charges for calls made from the first user's cellular telephone 134 that are routed through the IP telephony system 120 will simply appear on the first user's regular monthly IP telephony system bill.

Likewise, the IP telephony system 120 allows the second user to register his mobile computing device 136 as an extension telephony device. While incoming telephone calls directed to the second user's assigned telephone number will continue to be routed to the second user's IP telephone 108, the second user can place outgoing telephone calls though the IP telephony system 120 using his mobile computing device 136, even though the second user's mobile computing device 136 is provided with its native telephone service by a separate cellular telephony services provider.

As illustrated in FIG. 3, the IP telephony system 120 includes an extensions operating unit 200. The extensions operating unit 200 handles the registration of extension telephony devices, the setup and configuration of dialing aids, and the provisioning of telephony services to extension telephony devices.

An extension connection unit 202 is responsible for setting up calls for an extension telephony device. An authorization unit 204 is responsible for helping to register a telephony device as an extension of an existing account with the IP telephony system 120. The authorization unit 204 is also responsible for determining if a registered extension telephony device is authorized to receive certain telephony services from the IP telephony system.

An extension speed dial unit 205 can provide speed dial functions for extension telephony devices. A local to international number assignment unit sets up special numbers that can be called in various countries to reach an extension telephony device.

A forwarding unit 208 operates to forward calls that are originally directed to a customer's main telephone number to an extension telephony device that is associated with the user's account.

A quality checking unit 210 checks a quality of a data connection that is established between the IP telephony system 120 and an extension telephony device via a data network. Calls may be connected to an extension telephony device in various different ways depending on the determined connection quality.

When a user wishes to register a telephony device as an extension telephony device, the actual registration process could be handled by the authorization unit 204 in multiple different ways. In some instances, a user could utilize a website interface to register a telephony device that receives its native telephony service from a different telephony service provider as an extension telephony device. In other instances, the user could call a special access number maintained by the IP telephony system 120. This would connect the user to an interactive voice response system that would allow the user to register the extension telephony device. In other instances, a user could call and speak to a customer service representative that would assist with the registration of the extension telephony device.

It still other instances, such as where the extension telephony device is a mobile computing device, the user can download a software application onto the mobile computing device, and the software application can handle the registration of the mobile computing device as an extension telephony device. The application might also provide a user interface that allows the user to place telephone calls from the mobile computing device through the IP telephony system 120.

Figure 4:
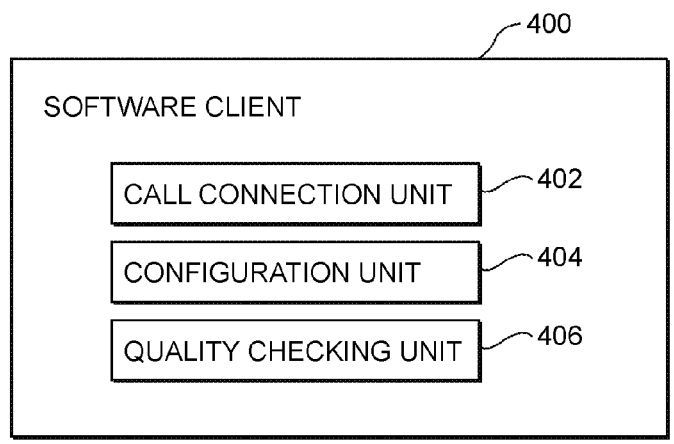
FIG. 4 illustrates elements of a software application that may be present on an extension telephony device.

FIG. 4 illustrates elements of a software application or client 400 that could be loaded onto an extension telephony device. The software client 400 includes a call connection unit 402 which establishes calls through the IP telephony system 120. A configuration unit 404 records certain preferences that the user has selected. As will be explained in greater detail below, those preferences can include preferences about how calls are connected, and references relating to the information that is presented to a called party in caller ID information. The software client also includes a quality checking unit 406, which determines a quality of a connection that an extension telephony device is able to establish with the IP telephony system 120 over a data network, or a quality of a connection to a wireless access point, or both.

Regardless of how it is accomplished, during the registration process the IP telephony system 120 obtains a telephone number or some other unique identifier associated with the extension telephony device. In addition, the authorization unit 204 may assign a unique personal identification number (PIN) to the extension telephony device. The user may be asked for the PIN when the user requests services through the IP telephony system 120. In other instances, the same PIN associated with the user's main account with the IP telephony system 120 might be used to authorize the provision of communications services to the user through the extension telephony device.

With reference to the communications environment illustrated in FIG. 1, the first user, whose primary IP telephony device is the telephone adaptor 104, would register his cellular telephone 134 as an extension telephony device. During the registration process, the authorization unit 204 obtains the telephone number associated with the cellular telephone 134. The authorization unit may also assign a PIN number that the user can provide when requesting communications services from the IP telephony system 120 through the cellular telephone 134.

Likewise, the second user would register his mobile computing device 136 as an extension telephony device. During the registration process, the authorization unit 204 could obtain a telephone number associated with the mobile computing device 136, or a unique identification number assigned to the mobile computing device 136, or both. Here again, the authorization unit 204 may assign a PIN number to the mobile computing device 136 that the second user would provide to obtain communications services from the IP telephony system 120 through the mobile computing device 136.

The IP telephony system 120 may allow a user to register one or a predetermined number of extension telephony devices without charge. Any calls placed from the extension telephony device(s) would then incur the same charges as calls made from the user's primary IP telephony device. If the user places a call with an extension device to a telephone number that is part of an unlimited calling plan, no additional charges would apply. If a call is placed with an extension telephony device to a telephone number that would incur a per minute charge, the same rate applies to calls made from the extension telephony device that would apply to calls made from the user's primary IP telephony device.

If the user wants to register additional extension telephony devices beyond the number that can be registered for free, the IP telephony system 120 may charge the user a monthly re-occurring charge for each additional extension device. Paying the monthly re-occurring charge would then entitle the user to obtain communications services through the extension telephony device at the same rates the user would be charged for communications services provided to the user through his primary IP telephony device. Alternatively, the user may be provided with the option of registering additional extension telephony devices without the need to pay a monthly re-occurring charge if the user instead pays per minute fees for calls placed from the additional extension telephony devices.

Also, the IP telephony system 120 could offer the user different pricing options for communications services provided to the user through an extension telephony device than for communications services provided to the user through the user's primary IP telephony device. Regardless, the user would continue to receive one monthly bill for charges incurred for communications services provided to the user through the user's primary IP telephony device and through the user's extension telephony devices.

The IP telephony system 120 could also allow a master account holder to specify a maximum allowable monthly spending limit for each extension telephony device. The master user could set and change those spending limits by interacting with the authorization unit 204 via a web portal, through an interactive voice response system, or using an application loaded on a mobile computing device. Alternatively, the master user could speak with a customer service representative to have the maximum spending limits set or changed.

When a user wishes to place a call from an extension telephony device via the IP telephony system 120, the call could be established in any of multiple different ways.

If the extension telephony device has a software client provided by the IP telephony system, and the extension telephony device is able to establish a data connection to a data network, such as the Internet, via a wireless access point, the call can be established without making use of the extension telephony device's native telephony service. Instead, the software client contacts the extension connection unit 202 of the IP telephony system 120 over the data network to request the setup of a call. The extension connection unit 202 then sets up a VOIP session to the extension telephony device over the data connection, and places an outgoing call to the requested party. The two calls are then effectively bridged together.

In instances where a software client on an extension telephony device cannot establish a data connection to the extension connection unit 202 of the IP telephony system 120 via a wireless access point, it may nevertheless be possible to establish the data connection via a cellular data service provided by the extension telephony device's native telephony service provider. In that case, the extension connection unit could still set up a VOIP session to the extension telephony device over the cellular data connection, and place an outgoing call to the requested party. The two calls are then effectively bridged together.

In instances where a software client on an extension telephony device cannot establish a data connection to the extension connection unit 202, or in instances where the extension telephony device does not have the ability to run a software client, it is still possible to setup a call through the IP telephony system 120. This is accomplished by placing a call to an access telephone number maintained by the IP telephony system. The call could be placed using the extension telephony device's native telephony service provider. Once connected to the IP telephony system 120, the extension telephony device can request that the IP telephony system 120 place an outgoing call that is connected to the extension telephony device. This type of a connection method is illustrated in FIG. 5.

Figure 5:
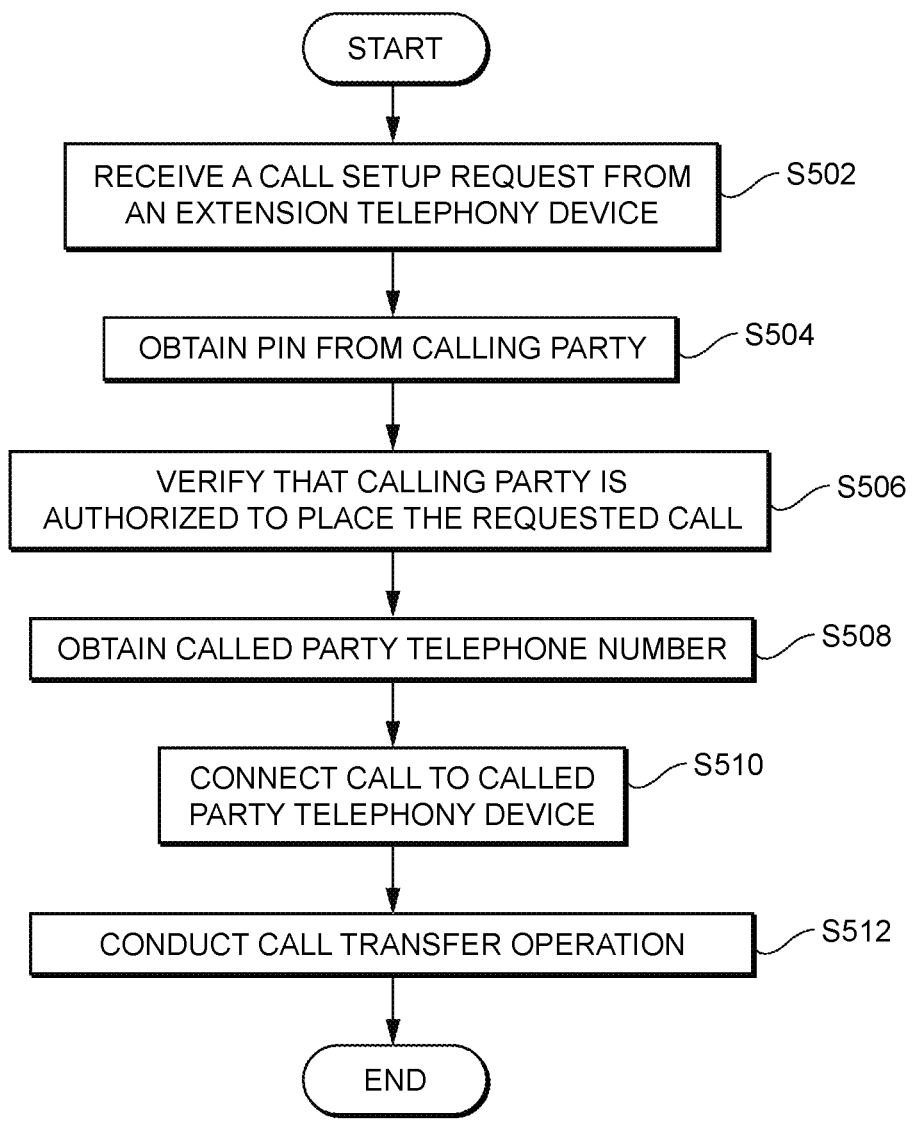
FIG. 5 is diagram illustrating steps of a method of providing telephony services to a telephone that is native to a first telephony system with elements of a second telephony system.

FIG. 5 illustrates the steps of a method 500 that would be performed by elements of the IP telephony system 120 to setup an outgoing call from an extension telephony device. The user places a call to a local access telephone number or to a toll free access number from a registered extension telephony device. The method begins and proceeds to step S502, where the call is received by the extension connection unit 202 of the IP telephony system 120 illustrated in FIG. 3.

The extension connection unit 202 obtains the telephone number of the extension telephony device through the caller ID information provided as part of the incoming call. In some instances, the extension connection unit 202 may obtain a unique ID number associated with the extension telephony device, or the extension connection unit 202 may request the user to input a unique identification number. The telephone number or unique identification number associated with the extension telephony device will be recognized because the user will have already registered the extension telephony device.

In step S504, the extension connection unit 202 asks the user to provide a PIN that is associated with the extension telephony device, or with the user's main account with the IP telephony system. This information could be provided to the extension connection unit in multiple different ways. It could be provided by the user pressing buttons on a keypad of the extension telephony device. Alternatively, the user might speak the information. In other instances, such as where an application is running on a mobile computing device, a query could be sent to an application running on the device, and the application could automatically provide the PIN information without further user intervention. Regardless, the extension connection unit 202 would acquire the information, and/or interpret any spoken responses using speech recognition assets.

In alternate embodiments, the provision of a PIN is not required. Instead, the caller ID information is used to verify the identity of the party.

In step S506, the extension connection unit 202 verifies that the calling party is authorized to place a call through the IP telephony system 120 using the extension telephony device. This would likely include interacting with the authorization unit 204 to verify that the obtained telephone number/unique identification number of the extension telephony device and the obtained PIN information match the information stored in the authorization unit 204.

Assuming the obtained information is verified, and the user is authorized to place a call through the IP telephony system 120 with the extension telephony device, in step S508 the extension connection unit 202 obtains the telephone number the user would like to call. This could occur in multiple different ways.

In a simple embodiment, the extension connection unit 202 prompts the user for the telephone number, and the user enters the telephone number using a keypad of the extension telephony device. The user might also speak the number, and the extension connection unit 202 would utilize speech recognition assets to interpret the user's spoken response.

In other instances, the user might be able to access a speed dial system that has been created for the user's main account with the IP telephony system 120, or which has been specifically created for the extension telephony device. For example, FIG. 3 illustrates that an extension speed dial unit 205 may be a part of the extension operations unit 200 of the IP telephony system 120.

A user could configure the extensions speed dial unit 205 so that multiple pre-stored telephone numbers correspond to predetermined numbered options for each extension telephony device. When a user calls a local access number with an extension telephony device, the extension connection unit 202 will determine the identity of the extension telephony device. The user could make a telephone number selection from the predetermined list maintained for that extension telephony device in the extension speed dial unit 205.

In more complex embodiments, the access number that was originally dialed by the user may be tied to a particular destination telephone number. If that is the case, then simply by virtue of the access number dialed by the user, the extension connection unit 202 will know what telephone number the user is attempting to reach. This concept is discussed in more detail below.

If the user is reaching the extension connection unit 202 from a mobile computing device that is running an application provided by the IP telephony system 120, the application may allow the user to easily select a telephone number from a contact list maintained on the mobile computing device. The application would then forward the telephone number on to the extension connection unit 202.

Once the extension connection unit 202 has obtained the telephone number the user wishes to reach, in step S510 the extension connection unit 202 causes a telephone call to be setup to the desired telephone number using normal IP telephony system assets, as is well known to those of ordinary skill in the art. In some instances, the telephone call will be established such that the called party telephony device receives caller ID information identifying the extension telephony device as the calling party. In other instances, the caller ID information may reflect the telephony number associated with the user's main account with the IP telephony system as the calling party. These options are discussed in greater detail below.

The IP telephony system 120 will create a CDR for the call, and the CDR will be updated, finalized and stored at the completion of the call. The CDR will later be used to bill the user for the call placed through the extension telephony device. For this reason, the CDR may include a field that indicates that the call was placed through a particular registered extension telephony device.

Once the call has been setup by the IP telephony system 120, the server that originally establishes the call may conduct an optional call transfer in step S412. The call transfer would allow the call signaling to proceed more directly between the extension telephony device and the called telephony device. When a call transfer is conducted, it would free up assets of the IP telephony system 120 for other uses.

In some embodiments, the user's extension telephony device may be a mobile computing device that is running an application provided by the IP telephony system 120. In such an embodiment, once a call is established to the extension connection unit 202, the application may send information to the extension connection unit that includes the telephone number of the extension telephony device, a unique identifier assigned to the user's extension telephony device, and/or a PIN number. Thus, a software application on an extension telephony device could automate the performance of certain steps illustrated in FIG. 5.

Figure 6:
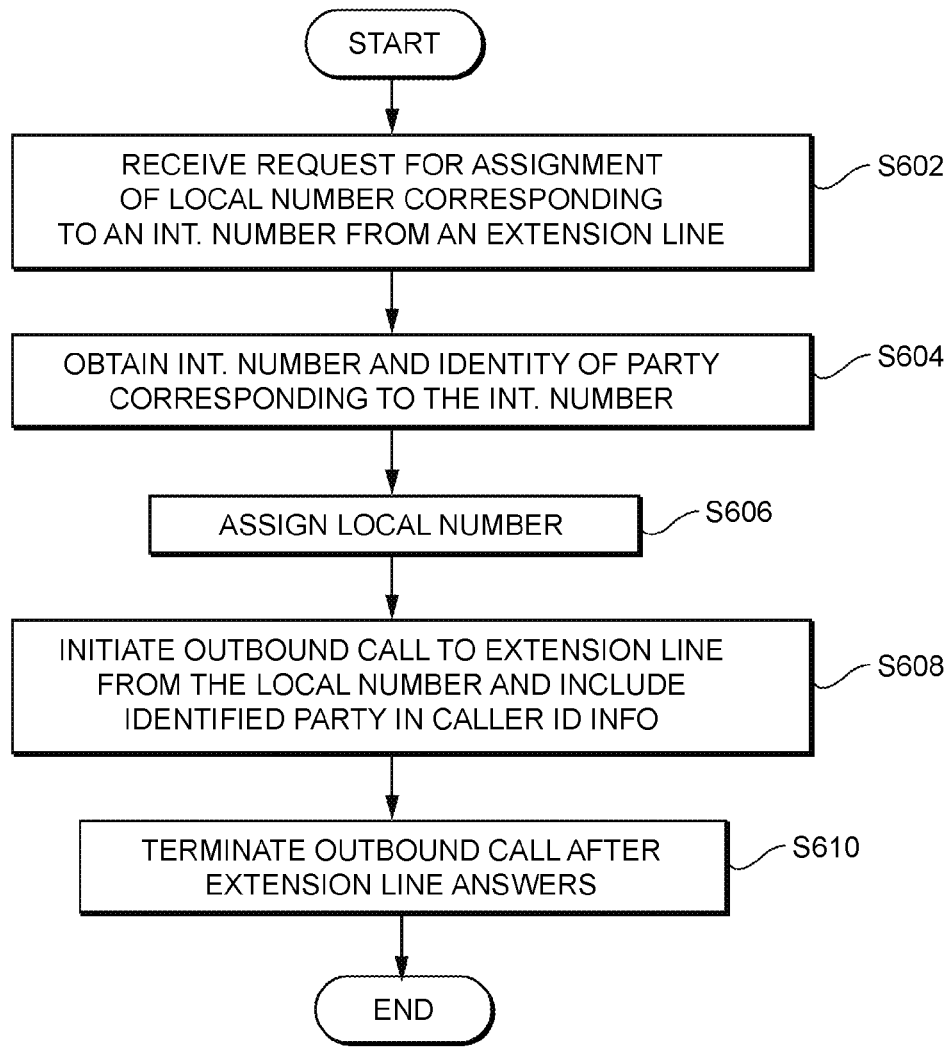
FIG. 6 is diagram illustrating steps of a method of assigning a local telephone number within a first country that a user within the first country can dial to be connected to a different telephone number in a second country.

As mentioned above, in some embodiments, the IP telephony system 120 can assign a local access number for a user to correspond to a number that the user frequently calls from his extension telephony device. For purposes of explanation, and with reference to FIG. 1, assume that the first user frequently uses his cellular telephone 134 to call his mother, who has analog telephone 152 in a different country. The first user has already registered his cellular telephone 134 as an extension telephony device with the IP telephony system 120. The first user can request that the IP telephony system assign a local access number to correspond to the telephone number assigned to his mother's analog telephone 152. Steps of a method to accomplish this assignment are illustrated in FIG. 6. The steps illustrated in FIG. 6 would be performed by elements of the IP telephony system 120.

The method 600 begins when the first user requests that a local access number be assigned to his mother's telephone number. This request would be received by the local to international telephone number assignment unit 206 of the extensions operation unit 200 of the IP telephony system 120, as shown in FIG. 3. The first user could interact with the local to international telephone number assignment unit 206 in multiple different ways. The first user could utilize a web interface, an interactive voice response system available through an access number, or the first user could speak with a customer service representative. If the first user's extension telephony device is a mobile computing device, an application running on the mobile computing device could also be used to interact with the local to international telephone number assignment unit 206.

The method begins and proceeds to step S602, where the local to international telephone number assignment unit 206 receives the request from the first user. In step S604, the local to international telephone number assignment unit 206 obtains the telephone number the first user wishes to be assigned, which in this case is the telephone number of his mother's analog telephone 152. The local to international telephone number assignment unit 206 also obtains the identity of the party at that telephone number, in this case, the first user's mother. In step S606, the local to international telephone number assignment unit 206 assigns a local access number that the first user can call to be connected to his mother's analog telephone 152. This number is ideally one that the first user can call from his extension telephony device without incurring any long distance or toll charges.

In step S608, the local to international telephone number assignment unit 206 initiates an outbound call to the first user's extension telephony device. The call will indicate that it has originated from the assigned local access number, and it will indicate that the call is from the first user's mother. When this information is captured by the first user's extension telephony device, it is easy for the first user to store this information in a contact list on the first user's extension telephony device. Thus, the local access number is communicated to the first user in an easy and convenient manner. In step S610, the outbound call is then terminated.

Once this process has been conduced, the first user can simply call the assigned local access number. When the call is received by the extension connection unit 202, the extension connection unit 202 will know both the local access number that was called, and the telephone number or ID number of the first user's extension telephony device. This will allow the extension connection unit 202 to determine the number that the first user wishes to call. The extension connection unit 202 may then ask the first user for the PIN number assigned to the first user's extension telephony device to ensure that the user's is authorized to make the call through the IP telephony system. As soon as the user provides the PIN, the call would be connected. In some embodiments, obtaining the PIN may not occur. In still other embodiments, a software application on the user's extension telephony device may automatically provide the PIN.

As mentioned above, in some instances a user could place a call from an extension telephony device that is a smartphone or a computer or a portable computing device running appropriate software. In these instances, some or all of the communications required to inform the extension operation unit 200 of the called party's telephone number, the user's account information and a PIN number can be automated by the software. The software might also make it easier for the user to input or select a telephone number of the party the user is attempting to reach.

Figure 7:
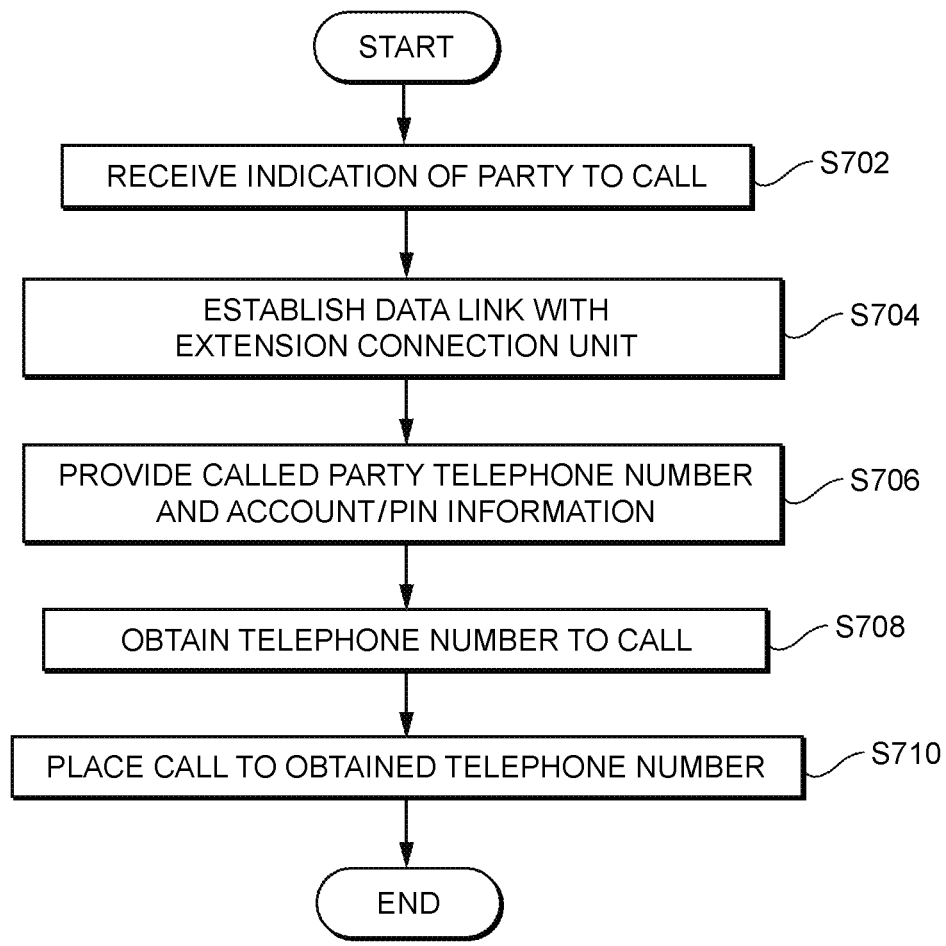
FIG. 7 is a diagram illustrating steps of a method that would be performed by software running on a smartphone or a computer that is acting as an extension telephony device to place a telephone call.
Figure 8:
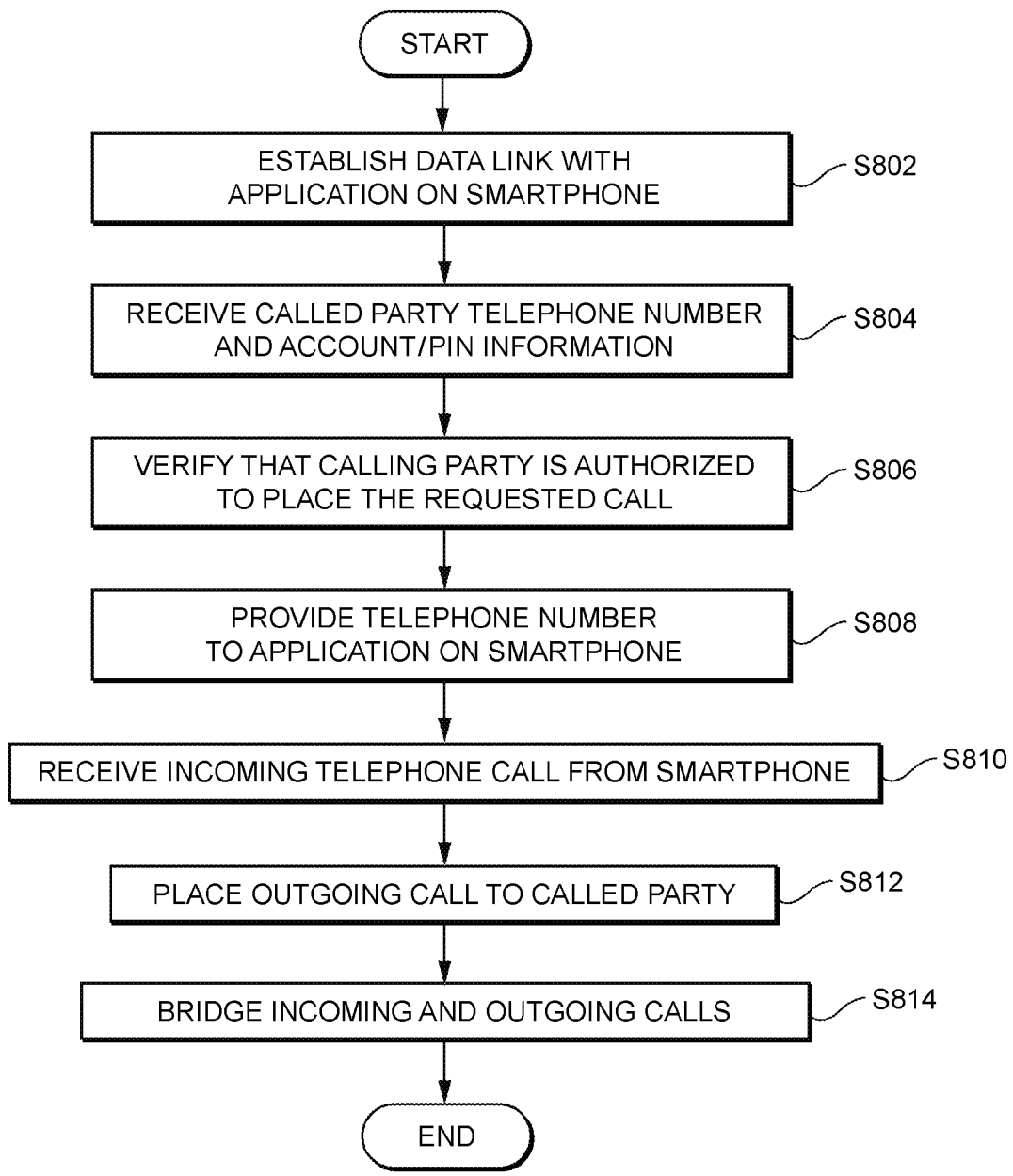
FIG. 8 is a diagram illustrating steps of a method that would be performed by an extension operations unit of an IP telephony system to connect a smartphone or a computer acting as an extension telephony device to a called party.

FIG. 7 illustrates steps of a method 700 that would be performed by an application on a smartphone or software on a computer in order to place a call while the smartphone or computer is acting as an extension telephony device. FIG. 8 illustrates steps of a method 800 that would be performed by the extensions operation unit 202 of an IP telephony system 120 to connect such an extension telephony device to a called party. In the following description, we will assume that the user is placing a call from a smartphone that is registered as an extension telephony device under a user's main account with an IP telephony system 120. However, the same basic steps would be performed if the user was placing a call from a computer or a portable computing device that is acting as an extension telephony device.

The method begins when a user decides to place a call using a smartphone as an extension telephony device. The user loads and runs an application on the smartphone that automates many of the steps the user would otherwise have to perform under the methods described above. The method begins and proceeds to step S702, where the application receives an indication from the user as to who the user wishes to call. This could be accomplished in many different ways. The user could simply type in the number the user wishes to call on a keypad of the smartphone. Alternatively, the application could cause a keypad to be displayed on a touch sensitive display screen on the smartphone, and the user could enter the telephone number using the displayed keypad. In still other instances, the application could present the user with a list of contacts, and the user could select one of the contacts from the list. In this instance, the contact list could be a contact list that is stored on the smartphone through another separate application, or a contact list that has been input and maintained on the smartphone using the application that has been run by the user to place a call using the smartphone as an extension telephony device. The actual data that constitutes the contact list could be stored on the smartphone itself, or it could be stored on a remote server that the smartphone is able access via a data connection.

Once the application has obtained the telephone number of the called party, in step S704, the application establishes a data link with the extension connection unit 202 of the extension operations unit 200 of the IP telephony system 120, as illustrated in FIG. 3. This data link could be established using a cellular data channel or via a wireless or wired link to a public or private data network, such as the Internet. Regardless of how the data link is established, the data link allows the application on the user's smartphone to communicate with a server that is part of the extension connection unit 202.

In step S706, the application informs the extension connection unit 202 of the called party's telephone number. The application may also provide the extension connection unit 202 with the telephone number of the user's smartphone, or a special identification number assigned to the user's smartphone or to the application running on the user's smartphone. This information will allow the extension connection unit to identify the user's smartphone as a registered extension telephony device.

The application may also automatically provide the extension connection unit 202 with a PIN number that was assigned to the user or to the user's smartphone or to the application loaded on the smartphone. The PIN number is used to verify the identity of the user or the smartphone for purposes of fraud prevention. In alternate embodiments, the application may require the user to enter or speak the PIN number, which would be another way of preventing an unauthorized user from placing a telephone call using someone else's smartphone.

In step S708, the application obtains a telephone number from the extension connection unit 202. Then, in step S710, the application causes the smartphone to call the telephone number it received from the extension connection unit 202.

As will be explained in greater detail below, the user would then be connected to the called party.

Although the embodiment illustrated in FIG. 7 ultimately connects the user to the called party through a telephone call placed to the telephone number obtained from the extension connection unit 202, in alternate embodiments, the user may be connected to the called party in some other fashion. For example, the data link established between the user's smartphone and the extension connection unit 202 could be used to establish a VOIP call to the called party. In other instances, the application on the user's smartphone may establish a VOIP call to the called party in some other fashion, with the assistance of the extension connection unit 202.

FIG. 8 illustrates steps of a method 800 performed by the extension operations unit 200 of the IP telephony system 120 to connect a smartphone running an application and acting as an extension telephony device to a called party. The method 800 begins and proceeds to step S802, where the extension connection unit 202 receives a communication from the application on the user's smartphone indicating that the application is attempting to place a call to a called party. In step S802, the extension connection unit 202 establishes a data link with the application on the smartphone. As noted above, this data link could be established in multiple different ways.

In step S804, the extension connection unit 202 receives several pieces of information from the application on the user's smartphone. First, the extension connection unit 202 receives either the telephone number of the user's smartphone or an identification number that was assigned to the user's smartphone or to the application running on the user's smartphone. This information is used to verify the identity of the user and to verify that the smartphone is a registered extension telephony device. The telephone number of the user's smartphone may also be used for caller ID purposes when the call is placed to the called party.

The extension connection unit 202 also receives the telephone number of the called party that the user is attempting to reach. The extension connection unit 202 may also automatically receive a PIN number from the application on the user's smartphone. Alternatively, the application may request that the user input a PIN number, and that information may then be provided to the extension connection unit 202. In still other embodiments, the extension connection unit 202 may send a query to the user, via the application on the user's smartphone, asking the user to input a PIN number. In some embodiments, the user may have the option of speaking the PIN number. In those embodiments, the application on the smartphone may interpret this spoken response, or the extension connection unit 202 may receive the audio of the spoken response, and the extension connection unit 202 may be responsible for interpreting the spoken response. In still other embodiments, a PIN may not be required. Instead, the user's identity may be verified using caller ID information.

In step S806, the extension connection unit 202 verifies that the user is authorized to place the requested call. This would likely include interacting with the authorization unit 204 to verify that the obtained telephone number/unique identification number of the smartphone and the obtained PIN information match the information stored in the authorization unit 204.

If the user is authorized to place the requested call, in step S808, the extension connection unit 202 provides the application on the user's smartphone with a telephone number that the smartphone can call to be connected to the called party. At this point, the application on the user's smartphone will place a call to the telephone number obtained from the extension connection unit 202, as described above in connection with FIG. 6.

In step S810, the extension connection unit 202 receives the incoming call from the user's smartphone. The extension connection unit 202 recognizes the user's smartphone through caller ID information, and the extension connection unit 202 will already know, from the previous information exchange with the application on the smartphone, what telephone number the user is attempting to call. In step S812, the extension connection unit 202 places an outgoing call to the called party, and in step S814, the extension connection unit 202 bridges the incoming and outgoing calls so that the user's smartphone is connected to the called party.

In some embodiments, the extension connection unit 202 waits to receive the incoming call from the user's smartphone before placing the outgoing call to the called party. In other instances, the extension connection unit begins to setup the outgoing call after it receives the called party's telephone number from the application on the user's smartphone and before it receives the incoming call from the user's smartphone. This would result in a faster connection for the user.

As noted above, in alternate embodiments, the user's smartphone may be connected to the called party in a different fashion. For example, because the extension connection unit 202 receives all required relevant information from the application on the user's smartphone via the initial data connection, the extension connection unit 202 may setup a VOIP call to the called party, and that call may be bridged to the user's smartphone using the same data connection that was used to receive information from the application on the user's smartphone. This would eliminate the need for the application to place a separate call to the telephone number provided by the extension connection unit 202.

The application on a user's smartphone, or software running on a computer or portable computing device, may provide additional functionality beyond merely allowing the user to place a call. For example, the software may also allow a user to perform a rate lookup to determine how much it will cost to place a particular call. The application may also allow a user to access his account information with the IP telephony system, and also edit or update that information. The application may also allow a user to place a text message to particular telephone number using the smartphone or computer as an extension telephony device.

In the examples given above, it was assumed that the user would already have an existing account with the IP telephony system, and that the user would have already registered a primary IP telephony device with the IP telephony system. In alternate embodiments, it is not necessary for a user to have a separate primary IP telephony device. Instead, a user would setup a new account with the IP telephony system with the intention of only registering a telephony device that is already registered with and provided service by a separate telephony service provider. This would allow the user to place calls from the telephony device using the native telephony service provider, or through the IP telephony system. In many instances, the IP telephony system may be able to provide the user with communications services at lower rates than the native telephony service provider would charge.

Also, in the examples given above, the user places a telephone call using an extension telephony device. However, the same basic procedures would be used if a user wishes to obtain other types of communications services from the IP telephony system via an extension telephony device. For example, the user could send SMS text messages, MMS messages and other forms of communications through the IP telephony system from an extension telephony device.

As explained above, in many instances, an application on a smartphone or computer that is acting as an extension telephony device can establish a data connection to the extension connection unit 202. The data connection can be used to establish a VOIP link to the extension telephony device. That VOIP link can be used to establish an outgoing call from the extension telephony device, or to receive an incoming call. However, conducting a good quality call in this fashion requires that the quality of the data connection between the extension telephony device and the extension connection unit 202 be sufficiently high to support a VOIP call.

Figure 9:
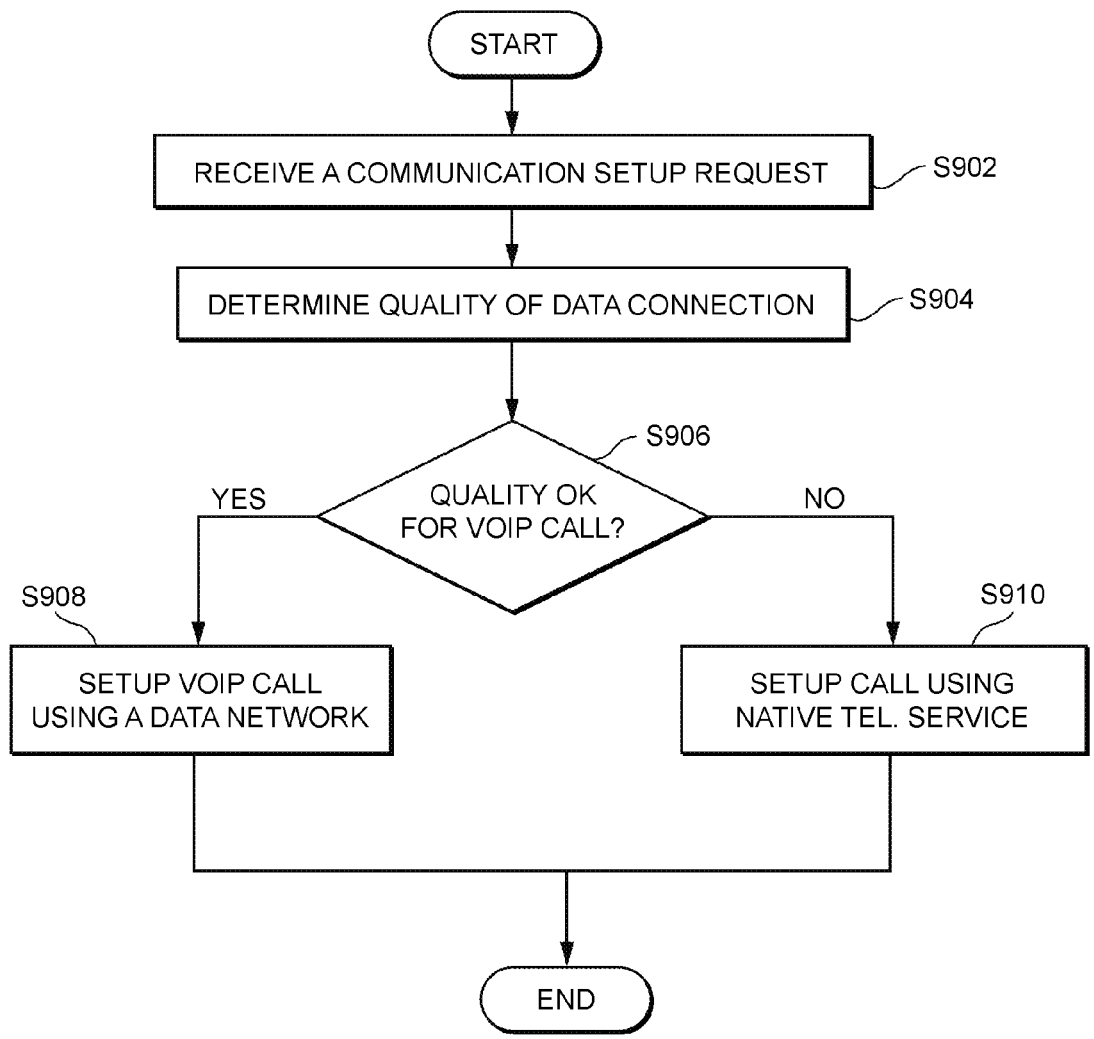
FIG. 9 illustrates steps of a method performed by elements of an IP telephony system to establish a telephony communication for an extension telephony device.

FIG. 9 illustrates steps of a method 900 that would be performed by elements of an extension connection unit 200 to setup a call for an extension telephony device. During this method, the quality of a data connection between the extension operations unit 200 and the extension telephony device is determined during an initial exchange. The call is then setup based on the determined quality.

The method 900 begins and proceeds to step S902 where the extension connection unit 202 receives a request from a registered extension telephony device to setup a new telephony communication. In step S904, a quality checking unit 210 of the extension operations unit checks the quality of a data connection between the extension operations unit 200 and the extension telephony device. This could be accomplished by monitoring how well data packets bearing the setup request were communicated from the extension telephony device to the extension operations unit 200. Also, when the setup request is received, the extension connection unit 202 could send an acknowledgement message back to the extension telephony device. The determination about the quality of the data connection could also be based on how well data packets bearing the acknowledgement message were communicated from the extension connection unit 202 to the extension telephony device.

In step S906, a check is performed to determine if the quality of the data connection between the extension telephony device and the extension operations unit 200 is sufficiently high to support a VOIP call. If so, the method proceeds to step S908, and a VOIP link is established between the extension connection unit 202 and the extension telephony device. That VOIP link is used for the outgoing call. If the check performed in step S906 indicates that the quality of the data connection is not sufficiently high to support a VOIP call, the outgoing call is established using the extension telephony device's native telephony service. In either case, the call can be established as explained above.

In alternate embodiments, the check of the quality of the data connection could be performed before a user actually requests that a call be established. For example, the quality check could be performed on a periodic basis. When quality checks are performed on a periodic basis, so long as the last quality check was performed relatively recently, a call could be established immediately upon user request.

Also, in some embodiments, a quality check is performed upon the occurrence of a triggering event. A triggering event could be when a mobile telephony device establishes a new data connection or switches a cellular connection from one base station to another. Other triggering events could include switching a WiFi transceiver on, switching a cellular transceiver on, or simply turning the telephony device on.

Figure 10:
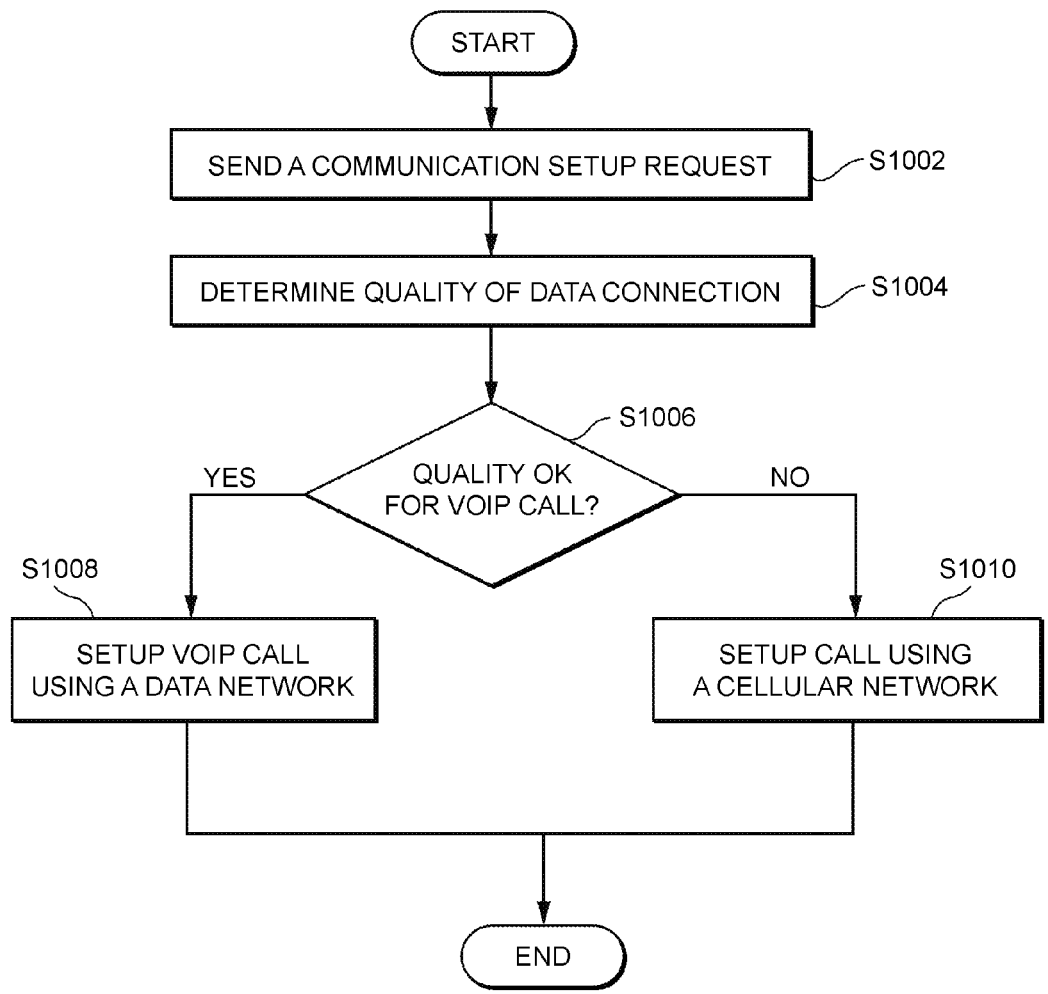
FIG. 10 illustrates steps of a method performed by a software application on an extension telephony device to establish a telephony communication for an extension telephony device.

FIG. 10 illustrates steps of a method 1000 that are performed by a software application 400 on the extension telephony device to accomplish this operation. The method 1000 begins and proceeds to step S1002, where a call connection unit 402 of the software application 400 sends a communication setup request to the extension connection unit 202 over a data connection. In step S1004, a quality checking unit 406 of the software application 400 checks the quality of the data connection. As mentioned above, this could include monitoring how well data packets bearing the setup request are communicated to the extension connection unit 202 and/or how well data packets bearing an acknowledgement message are communicated from the extension connection unit 202 back to the extension telephony device. In addition, the quality checking unit 406 of the software application 400 may also check a quality of a connection that has been established between the extension telephony device and a wireless access point that provides the extension telephony device with access to a data network. This information could be used alone, or together, with information about how well data packets are being communicated back and forth between the extension telephony device and the extension connection unit 202.

In step S1006, a check is performed to determine if the quality of the data connection between the extension telephony device and the extension operations unit 200 is sufficiently high to support a VOIP call. If so, the method proceeds to step S1008, and a VOIP link is established between the extension connection unit 202 and the extension telephony device. That VOIP link is used for the outgoing call. If the check performed in step S1006 indicates that the quality of the data connection is not sufficiently high to support a VOIP call, the outgoing call is established using the extension telephony device's native telephony service. In either case, the call can be established as explained above.

The methods illustrated in FIGS. 9 and 10 ensure that the quality of an outgoing call from an extension telephony device remains high. Where the data network can be used to carry the call, it is used to avoid making use of the extension telephony device's native telephony service. This can minimize charges that the user must pay for use of the extension telephony device.

In the above methods, the data network connection that is established between the extension telephony device and the extension operations unit 200 of the IP telephony system could be a data connection that is established through a wireless access point. Alternatively, the data connection could be one established through a cellular data link that is provided as part of the extension telephony device's native telephony service.

The software application 400 on an extension telephony device includes a configuration unit 404, which can record various user preferences. One such user preference is how calls to the extension telephony device are to be established. For example, the user could specify that the extension telephony device is not to establish an outgoing call through the IP telephony system 120 unless it can be accomplished via a data connection established through a wireless access point. This would prevent the software application from setting up a call through the IP telephony system using the extension telephony device's native telephony service.

Alternatively, the user could specify that calls through the IP telephony system can be established via a data connection through a wireless access point, or via a cellular data channel provided as part of the extension telephony device's native telephony service. This would prevent the software application 400 from setting up a call using minutes of a calling plan that is part of the extension telephony device's native telephony service.

The user may also specify that any type of connection could be used to establish a call through the IP telephony system 120. This would give the software application 400 maximum flexibility to setup the call using the channel that provides the best quality. However, the user may still specify a preference about which channel is used.

As mentioned above, a registered extension telephony device is intended to be an extension of the user's basic telephony service provided by the IP telephony system 120. As such, it is also desirable to use an extension just like a normal extension telephone that is present in a user's residence or office. In other words, it is desirable to be able to use both the user's primary registered telephony device and an extension telephony device in parallel, at the same time to allow multiple parties to be connected to the same incoming or outgoing telephony communication. For example, if a user received an incoming telephone call in the user's residence, and the user answered the call with the user's primary telephony device associated with the user's account, it would be desirable to allow a second person to connect to that telephony communication using the extension telephony device.

Figure 11:
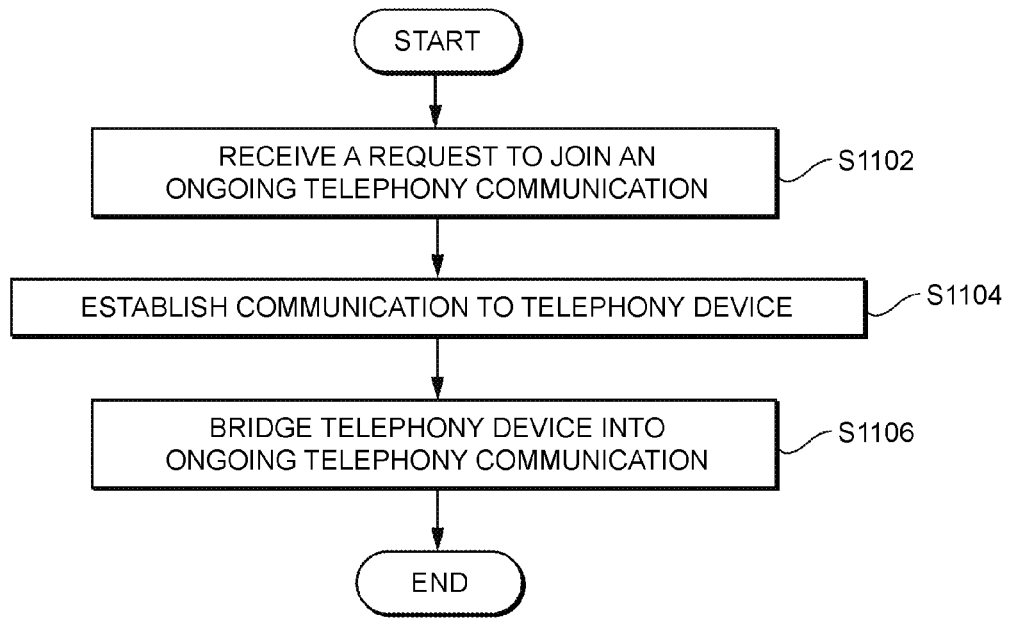
FIG. 11 illustrates steps of a method performed by elements of an IP telephony system to connect an extension telephony device to an ongoing telephony communication.

FIG. 11 illustrates steps of a method 1100 that would be performed by elements of an IP telephony system to connect an extension telephony device to an ongoing telephony communication that has been established to the main telephony device registered for the user's account with an IP telephony system 120. The ongoing telephony communication could be an outgoing call or an incoming call.

The method 1100 begins and proceeds to step S1102, where the extension connection unit 202 of an extension operations unit 200 of an IP telephony system 120 receives a request from an extension telephony device to join an ongoing telephony communication that has been established to a main telephony device that is associated with the user's account with the IP telephony system 120. The request could be received from a software application on the extension telephony device via a data network connection.

In step S1104, the extension connection unit 202 establishes a telephony connection to the extension telephony device. This could be a VOIP link established over a data connection, or a telephone link established over the native telephony service of the extension telephony device. Any of the methods described above could be used to establish the telephony link between the extension connection unit 202 and the extension telephony device.

In step S1106, the telephony link to the extension telephony device is effectively bridged to the ongoing telephony communication that has been established for the primary telephony device registered for the user's account. As a result, the user of the extension telephony device will be able to participate in the call. This type of a bridge arrangement essentially resembles a conference call.

If the user of the primary telephony device associated with the account hangs up, the telephony communication may continue between the user of the extension telephony device and the third party. Alternatively, the termination by the primary telephony device may act to terminate the call with respect to all parties.

Figure 12:
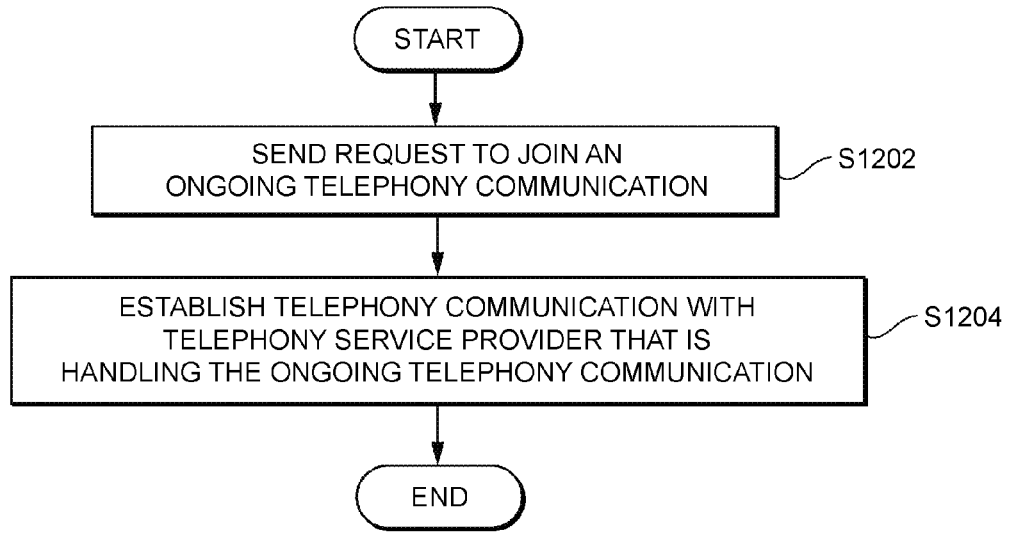
FIG. 12 illustrates steps of a method performed by an extension telephony device to join an ongoing telephony communication.

FIG. 12 illustrates steps of a method 1200 that would be performed by the software application on an extension telephony device to accomplish the same operations. The method 1200 begins and proceeds to step S 1202, where the software application sends a request to join an ongoing telephony communication to the extension connection unit 202. In step S1204, the software application would act to establish a telephony link between the extension telephony device and the extension connection unit 202 using any of the methods which have been described above. Assuming the telephony link is established, the extension connection unit 202 would then bridge the telephony link to the ongoing telephony communication so that the user of the extension telephony device can join the ongoing telephony communication.

In order for the user of the extension telephony device to join an ongoing telephony communication that has been established for the primary telephony device associated with the account, the user of the extension telephony device must first be made aware of the existence of the telephony communication. This could occur because the user of the extension telephony device is co-located with the user of the primary telephony device. Alternatively, each time that a call is established for the primary telephony device, a message could be sent to the software application on the extension telephony device that notifies of the existence of the telephony communication. The message could include information about the identity of the third party to the communication. The software application could use this message and information to provide a notification to the user about the telephony communication, and the software application could ask the user if the user wishes to join the telephony communication. If the user responds affirmatively, the methods illustrated in FIGS. 11 and 12 would then be performed.

FIG. 3 illustrates that the extension operations unit 200 includes a forwarding unit 208. The forwarding unit 208 could act to forward telephony communications that are directed to the telephone number of the primary telephony device associated with an account to one or more extension telephony devices associated with the account. The user could make use of a web interface, an interactive voice response system or the user could interact with a customer service agent to configure how and when telephony communications are to be forwarded to an extension telephony device. The forwarding could be automatically activated and deactivated based on the user's preferences.

For example, the user could specify that during business hours, all telephony communications directed to the user's primary telephony device in the user's residence are to be forwarded to a mobile telephone which is registered as an extension telephony device. Alternatively, the user could specify that during non-business hours, telephony communications directed to a primary telephony device in the user's office are to be forward to a mobile telephony device that is registered as an extension telephone device. Any other sort of preferences could also be followed to automatically forward telephony communications to an extension telephony device.

If a user has multiple extension telephony devices, the user could specify that any forwarded communications are to be forwarded to all extension telephony devices simultaneously, or that the extension telephony devices are to be rung in a particular order until one of the extension telephony devices answers.

When a user places an outgoing call from an extension telephony device, the caller ID information that is sent to the called party could reflect any of several different calling party identifiers. The caller ID information could include a calling party identifier associated with the extension telephony device itself, such as the telephone number of the extension telephony device as established by the extension telephony device's native telephony service provider. Alternatively, the caller ID information could include a calling party identifier of a primary telephony device associated with the user's account with the IP telephony system.

A user of an extension telephony device could record a preference about which calling party identifier is to be used in the configuration unit 404 of a software application 400 on the extension telephony device. Alternatively, such a preference could be recorded in an element of the extension operations unit 200. In still other embodiments, a user may be queried each time that an outgoing call is placed from the extension telephony device, the query asking the user to specify which calling party identifier is to be reflected in caller ID information sent to the called party.

Figure 13:
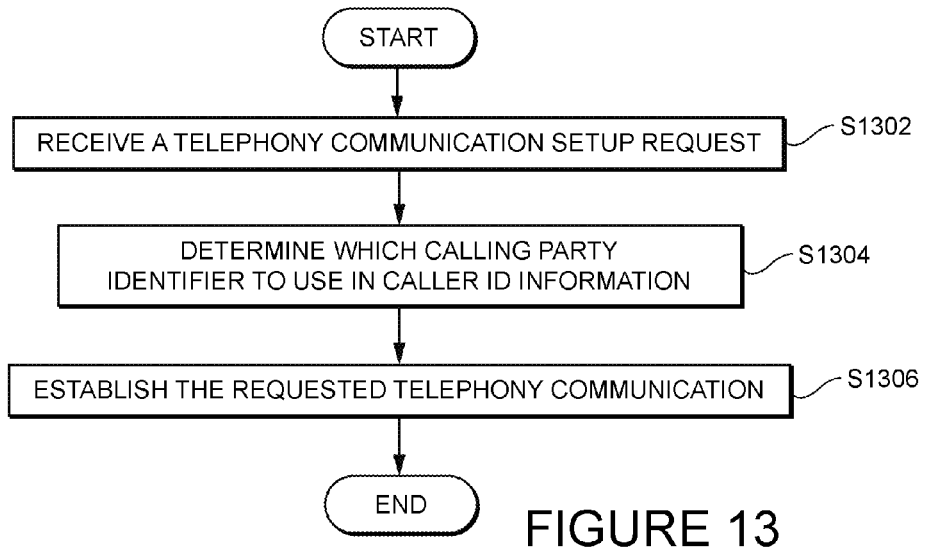
FIG. 13 illustrates steps of a method performed by elements of an IP telephony system to determine which calling party identifier to use in caller ID information.

FIG. 13 illustrates steps of a method 1300 that would be performed by elements of an extension operations unit 200 of an IP telephony system 120 when an outgoing call is to be established for an extension telephony device. The method would begin and proceed to step S1302, where the extension connection unit 202 receives a communication setup request from an extension telephony device. In step S1304, the extension connection unit determines which calling party identifier to use in caller ID information that is to be sent to the called party. The determination could be made by consulting preferences that have been stored in the extension operations unit. Alternatively, the extension connection unit 202 could query a software application on the extension telephony device to determine which calling party identifier to use. In still other instances, the calling party identifier that is to be used may be identified in the call setup request that was received from the extension telephony device.

In step S1306, the requested communication is established. During the establishment of the communication, caller ID information that includes the determined calling party identifier is sent to the called party. The call could be established for the extension telephony device using any of the many methods described above.

Figure 14:
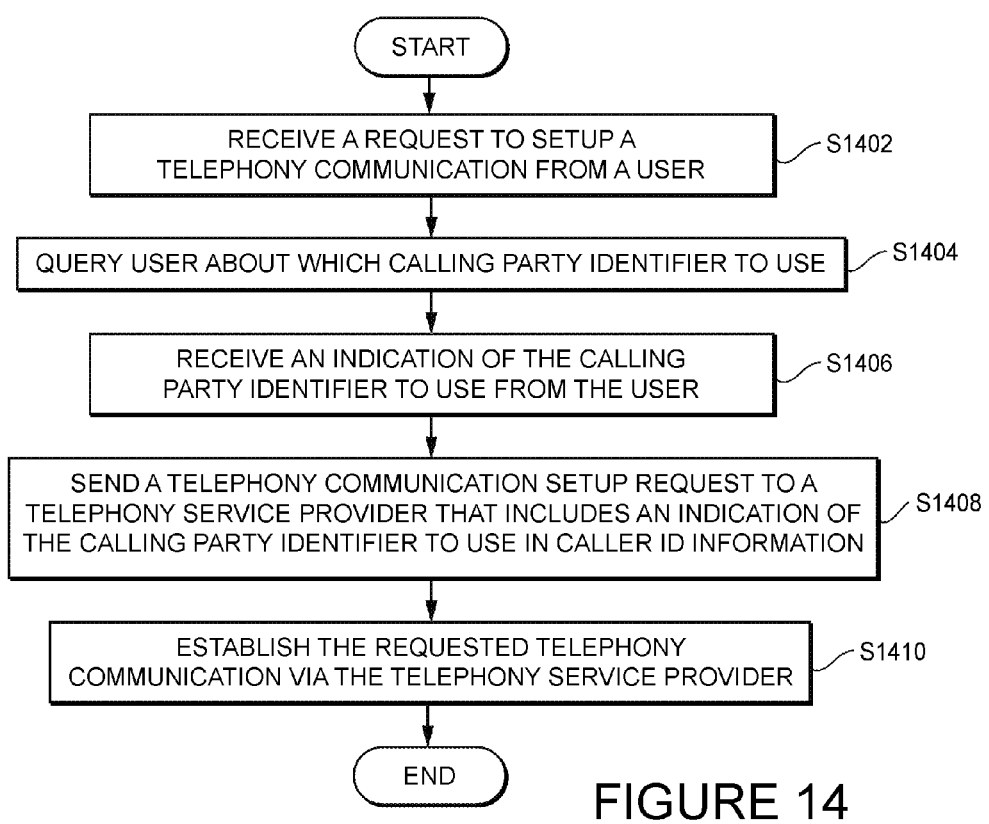
FIG. 14 illustrates steps of a method performed by a software application of an extension telephony device to determine which calling party identifier to use in caller ID information.

FIG. 14 illustrates steps of a method 1400 that would be performed by a software application on an extension telephony device to setup an outgoing telephony communication through the IP telephony system 120. The method begins and proceeds to step S1402 where the software application receives a request from a user to setup an outgoing telephony communication. In step S1404, the software application queries the user about which calling party identifier to use. In step S1406, the software application receives input from the user that indicates which calling party identifier to use. In step S1408, the software application sends a communication setup request to the extension connection unit 202 of an extension operations unit 200 of an IP telephony system 120. The communication setup request includes an indication of which calling party identifier to use in caller ID information that is to be sent to the called party. In step S1410, the software application interacts with the extension connection unit 202 to establish the requested telephony communication.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of providing communications services, comprising:

receiving, at a first telephony services provider, a request for communications services from a first telephony device that receives its native telephony service from a second telephony services provider, wherein the request includes caller ID information that identifies a telephone number assigned to or associated with the first telephony device, wherein the telephone number assigned to or associated with the first telephony device is controlled by the second telephony services provider, wherein the first telephony services provider is an Internet Protocol (IP) telephony system, wherein the second telephony services provider is a cellular telephony system, and wherein receiving a request for communications services from a first telephony device comprises the IP telephony system receiving a communication from a software application on the telephony device via a data network;

determining whether the first telephony device is entitled to receive the requested communications services based on at least the caller ID information identifying the telephone number assigned to or associated with the first telephony device that is included in the received request; and providing the requested communications services if the first telephony device is determined to be entitled to receive the requested communications services, wherein providing the communications services comprises sending a communication to a second telephony device, the communication including caller ID information that includes the telephone number assigned to or associated with the first telephony device.

2. The method of claim 1, where the determining step comprises determining if the first telephony device is associated with a valid account of the first telephony services provider based on the telephone number assigned to or associated with the first telephony device.

3. The method of claim 2, further comprising the steps of:

receiving, at the first telephony services provider, a second request for communications services from a third telephony device that receives its native telephony service from the second telephony services provider, wherein the request includes caller ID information that identifies a telephone number assigned to or associated with the third telephony device;

determining whether the third telephony device is entitled to receive the requested communications services based on at least the caller ID information identifying the telephone number assigned to or associated with the third telephony device that is included in the received request, wherein determining whether the third telephony device is entitled to receive the requested communications services comprises determining that the third telephony device is associated with the same account of the first telephony services provider as the first telephony device; and providing the requested communications services if the third telephony device is determined to be entitled to receive the requested communications services, wherein providing the communications services comprises sending a communication to a fourth telephony device, the communication including caller ID information that includes the telephone number assigned to or associated with the third telephony device.

4. The method of claim 1, wherein receiving a request for communications services comprises receiving an incoming telephone call from the first telephony device.

5. The method of claim 4, wherein receiving an incoming telephone call from the first telephony device comprises receiving caller ID information that includes the telephone number assigned to or associated with the first telephony device.

6. The method of claim 1, wherein providing the requested communications services comprises sending an SMS or MMS message to the second telephony device, the SMS or MMS message indicating that it originated from the telephone number assigned to or associated with the first telephony device.

7. The method of claim 1, wherein providing the requested communications services comprises determining a telephone number of the second telephony device based on the telephone number assigned to or associated with the first telephony device, and based on a telephone number to which the request for communications services was directed.

8. A system for providing communications services, comprising:
   an extension connection unit that is part of a first telephony services provider and that receives a request for communications services from a first telephony device that receives its native telephony service from a second telephony services provider, wherein the request includes caller ID information that identifies a telephone number assigned to or associated with the first telephony device, wherein the telephone number assigned to or associated with the first telephony device is controlled by the second telephony services provider, wherein the first telephony services provider is an Internet Protocol (IP) telephony system, wherein the second telephony services provider is a cellular telephony system, and wherein the extension connection unit receives the request for communications services from a software application on the telephony device via a data network;
   an authorization unit that is also part of the first telephony services provider and that determines whether the first telephony device is entitled to receive the requested communications services based on at least the caller ID information identifying the telephone number assigned to or associated with the first telephony device that is included in the received request; wherein the extension connection unit provides the requested communications services if the first telephony device is determined to be entitled to receive the requested communications services, wherein providing the communications services comprises sending a communication to a second telephony device, the communication including caller ID information that includes the telephone number assigned to or associated with the first telephony device.

9. A system for providing communications services, comprising:
   means for receiving, at a first telephony services provider, a request for communications services from a first telephony device that receives its native telephony service from a second telephony services provider, wherein the request includes caller ID information that identifies a telephone number assigned to or associated with the first telephony device, wherein the telephone number assigned to or associated with the first telephony device is controlled by the second telephony services provider, wherein the first telephony services provider is an Internet Protocol (IP) telephony system, wherein the second telephony services provider is a cellular telephony system, and wherein receiving a request for communications services from a first telephony device comprises the IP telephony system receiving a communication from a software application on the telephony device via a data network;
   means for determining whether the first telephony device is entitled to receive the requested communications services based on at least the caller ID information identifying the telephone number assigned to or associated with the first telephony device that is included in the received request; and means for providing the requested communications services if the first telephony device is determined to be entitled to receive the requested communications services, wherein the means for providing the communications services sends a communication to a second telephony device, the communication including caller ID information that includes the telephone number assigned to or associated with the first telephony device.

10. The system of claim 8, wherein the software application is one that was provided by the IP telephony system.

11. The system of claim 8, where the authorization unit determines if the first telephony device is associated with a valid account of the first telephony services provider based on the telephone number assigned to or associated with the first telephony device.

12. The system of claim 11, wherein:
   the extension connection unit also receives a second request for communications services from a third telephony device that receives its native telephony service from the second telephony services provider, wherein the request includes caller ID information that identifies a telephone number assigned to or associated with the third telephony device;
   the authorization unit determines whether the third telephony device is entitled to receive the requested communications services based on at least the caller ID information identifying the telephone number assigned to or associated with the third telephony device that is included in the received request, wherein the authorization unit determines that the third telephony device is associated with the same account of the first telephony services provider as the first telephony device; and
   the extension connection unit provides the requested communications services if the third telephony device is determined to be entitled to receive the requested communications services, wherein providing the communications services comprises sending a communication to a fourth telephony device, the communication including caller ID information that includes the telephone number assigned to or associated with the third telephony device.

13. The system of claim 8, wherein the extension connection unit receives a request for communications services by receiving an incoming telephone call from the first telephony device.

14. The system of claim 13, wherein when the extension connection unit receives an incoming telephone call from the first telephony device, the extension connection unit receives caller ID information that includes the telephone number assigned to or associated with the first telephony device.

15. The system of claim 8, wherein the extension connection unit sends an SMS or MMS message to the second telephony device, the SMS or MMS message indicating that it originated from the telephone number assigned to or associated with the first telephony device.

16. The system of claim 8, wherein the extension connection unit determines a telephone number of the second telephony device based on the telephone number assigned to or associated with the first telephony device, and based on a telephone number to which the request for communications services was directed.

17. The method of claim 1, wherein the software application is one that was provided by the IP telephony system.

* * * * *